Dec. 15, 1970   T. H. ROELOFS ET AL   3,546,793
EDUCATIONAL APPARATUS
Filed June 5, 1968                           2 Sheets-Sheet 2
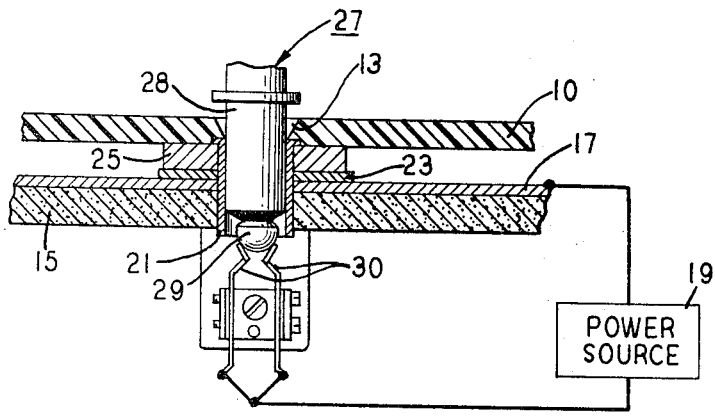
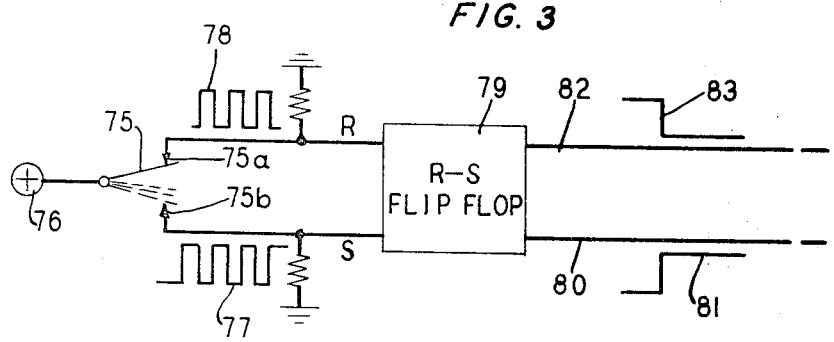
INVENTORS
THOMAS H. ROELOFS
EDWARD J. WELDON, JR.
BY
Lucian C. Canepa
ATTORNEY

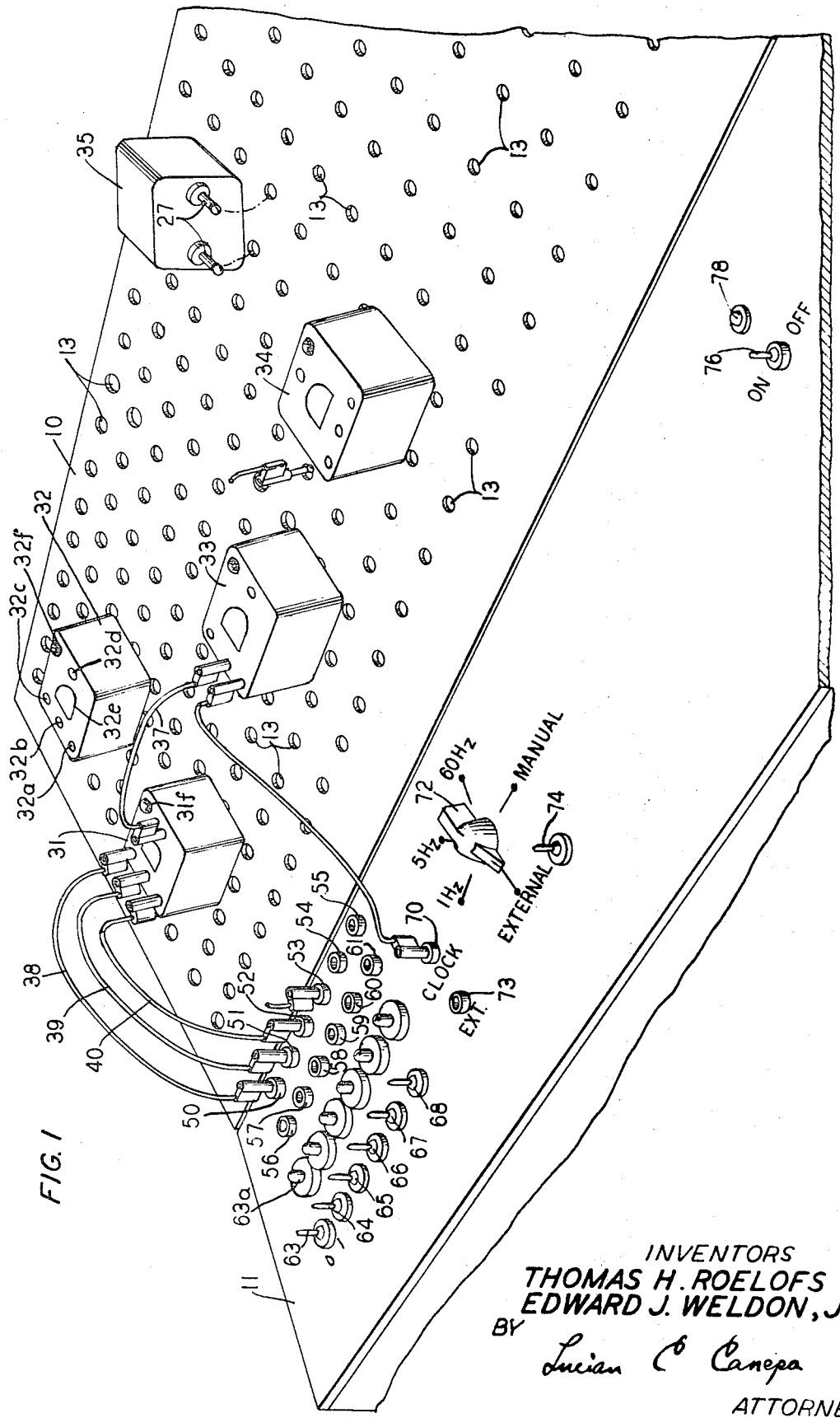

3,546,793
EDUCATIONAL APPARATUS
Thomas H. Roelofs and Edward J. Weldon, Jr., Honolulu, Hawaii, assignors to Adtech Incorporated, Honolulu, Hawaii, a corporation of Hawaii
Filed June 5, 1968, Ser. No. 734,612
Int. Cl. G09b 23/18
U.S. Cl. 35—19                                        1 Claim

ABSTRACT OF THE DISCLOSURE

An educational aid for teaching and demonstrating the design and principles of operation of logic circuits includes a logic board and a plurality of associated logic modules. By positioning the modules on the board to correspond to the actual schematic layout of a circuit to be simulated, and by applying appropriate logic and clock signals to the modules, the operation of any constructed logic circuit can be demonstrated in a visually effective manner.

---

This invention relates to logic circuits and more particularly to an improved educational and training apparatus for demonstrating and teaching the principles and operation of logic circuits.

One of the main categories of circuits out of which modern day information processing systems such as computers and switching centers are constructed is the so-called logic circuit. Accordingly, in recent years, considerable effort has been directed to teaching students the theoretical principles and an understanding of the actual operation of such circuits. In the facilitation of such a teaching endeavor it has been found highly advantageous to employ physical training aids that can be manipulated by the student and/or instructor to simulate in a dynamic way a variety of actual logic circuits.

Accordingly, an object of the present invention is an improved educational and training apparatus.

More specifically, an object of this invention is a flexible, realistic and self-contained training aid adapted for visually demonstrating the principles and operation of logic circuits.

Another object of the present invention is an economical, durable, fool-proof, portable and easily constructed logic circuit training aid.

A further object of this invention is a logic circuit teaching aid which can be physically arranged in a configuration identical to the schematic diagram of a logic circuit to be simulated.

Briefly, these and other objects of the present invention are realized in a specific illustrative embodiment thereof that comprises a logic board and an associated plurality of modules each of which comprises a basic logic circuit. The board comprises a main apertured surface on which the modules may be positioned to face in any desired horizontal or vertical orientation. Each aperture is adapted to permit a male connector extending from the bottom of a module to project through the board and make contact with electrical conductors disposed under the board that connect to a source of energization potential for the circuit contained in the module.

Illustratively, each module contains two male connectors adapted to be inserted into any two adjacent horizontally- or vertically-disposed apertures in the logic board. By means of these connectors the modules can be easily plugged and unplugged and faced in a stable manner in any horizontal or vertical direction on the main surface of the board without the use of any tools.

Each module contains on a visible face thereof a symbol representative of the particular logic circuit contained therein. In addition, each module includes as an integral part thereof an indicator or status light whose condition is indicative of the state of the contained circuit. Signals are applied to and abstracted from each module by means of jacks mounted thereon.

The logic board of the illustrative embodiment also includes a control section. This section comprises a plurality of switches by means of which "1" and "0" signal potentials may be established at respective pairs of associated jacks. In turn, the potentials so established may be applied by means of jumper leads to modules mounted on the main surface of the board. Connections between modules are also made by jumper leads.

Also included in the control section of the illustrative board is a clock rate selection switch. This switch permits selection of any one of a number of different types of clock signals. The selected signals are available at a clock jack for application to any of the mounted modules to serve as clock or enable signals therefor.

A feature of the present invention is a logic board having associated therewith a plurality of status-visible modular circuit blocks that can be easily plugged into and unplugged from the board.

Another feature of this invention is a board-module assembly in which each module can be mounted at any one of a large number of positions to face in either horizontal or vertical direction (i.e., left or right or up or down) so as to correspond exactly in position and orientation with the symbol therefor on a schematic layout drawing of the logic circuit represented by the assembly.

Still another feature of the present invention is that the board include a control section from which manually-set groups of logic signals and any one of a number of different clock signals may be applied to mounted modules.

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts the physical layout of a specific illustrative embodiment of the principles of the present invention;

FIG. 2 is a cross-sectional view of a portion of the apertured member shown in FIG. 1; and FIG. 3 shows the details of an advantageous switch arrangement adapted to be included in the FIG. 1 embodiment.

The embodiment shown in FIG. 1 includes a logic board that comprises a main apertured insulating member 10 and an associated control member 11. Although the members 10 and 11 may constitute different portions of a single integrally-formed insulating sheet element, it is advantageous for reasons of visibility and ease of accessibility to form the board from two separate connected-together pieces. Illustratively, the top surface of the insulating member 11 is arranged in a horizontal plane and the top surface of the member 10 is inclined therefrom, as indicated in FIG. 1.

The member 10 includes a multiplicity of equally-spaced-apart holes 13 formed therethrough. These holes may be considered to be arranged along a plurality of imaginary horizontal and vertical reference lines on the member 10. By extending an appropriate male connector into any one of the holes 13, contact can thereby be made to the respective terminals of a conventional direct-current power source disposed under the illustrative logic board.

FIG. 2 shows one particular illustrative manner in which the apertures 13 provide access to the aforementioned direct-current power source. Spaced apart from the member 10 is an insulating element 15 on which is positioned a suitable electrically-conductive member 17 such as, for example, a copper sheet which is connected via an electrical lead to one side (for example the grounded side) of a direct-current power source 19. Embedded in the element 15 and extending through the member 17 is an electrically-conductive sleeve 21. Disposed on top of the member 17 and about the sleeve 21 are a conductive washer 23 and a conductive nut 25. The elements 21, 23 and 25 are arranged to maintain the sleeve 21 in good electrical contact with the member 17.

When a male connector such as, for example, a conventional telephone-type plug connector (which extends from a logic module, to be described in detail below) is inserted into the aperture 13 shown in FIG. 2, the upper shank portion 28 of the connector frictionally engages and makes electrical contact with the sleeve 21 of FIG. 2. A lower portion 29 of the connector is adapted to engage two conventionally-mounted conductive leaf spring members 30 aligned in registry with the aperture 13. The members 30 are electrically tied together and to the other side of the power source 19. Thus, insertion of the connector 27 into the aperture 13 is effective to connect a prescribed direct-current potential between the respective portions 28 and 29 of the connector.

In FIG. 1 four logic modules 31 through 34 are shown mounted on (i.e., plugged into) the apertured member 10 of the illustrative logic board. Another module 35 is depicted on its side on the member 10 thereby to show clearly the telephone-type male connectors 27 that extend from the bottom thereof. Actually only one connector per module is required to connect the necessary direct-current operating potentials thereto. However, by connecting the connectors together in parallel within each module, a significant measure of added reliability (in insuring that each module is supplied with its required operating potentials) is thereby achieved. Moreover, the second connector extending from each module is available to facilitate the mechanical positioning, aligning and stabilizing of the module. Of course, an insulating stud member, for example, could be substituted for the second connector to achieve the specified mechanical purposes. But then the additional reliability feature mentioned above would be lost.

Each of the modules shown in FIG. 1 comprises a housing in the top surface of which are included a plurality of input and output jacks. Thus, for example, the module 32 includes three female input jacks 32a, 32b and 32c and a female output jack 32d. The illustrative module 32 further includes on the top surface thereof a logic symbol 32e indicative of the particular logic function (for instance AND, OR or NOT) adapted to be performed by the circuitry contained within the module.

Also disposed on the top surface of each logic module made in accordance with the principles of the present invention is an indicator or status light. Thus the module 32 includes a light 32f which is connected to the circuitry of the module so as, for example, to be illuminated or not when the circuitry is respectively providing an output "1" or "0" signal at the jack 32d.

The circuitry contained within each of the logic modules described herein may comprise an implementation (advantageously in integrated circuit form) of any one of a large variety of known logic circuits. In this connection it is known that any desired switching or computing system may be constructed from a set of basic building blocks comprising AND, OR and NOT circuits. Hence by way of illustration the modules herein may each be adapted to carry out one of these logic functions. However, even when this particular set of logic circuits is employed, the flexibility of the arrangement can be enhanced if additional more complex modules each containing a plurality of interconnected logic circuits (arranged, for example, to form a flip-flop) are provided.

Signals may be applied to a mounted logic module from the output jacks of another module or from the control member 11. Thus, for example, the output jack of the module 31 of FIG. 1 is shown connected via a jumper lead 37 to the middle input jack of the module 33. Additionally, jumper leads 38 through 40 are shown respectively connected between logic signal jacks 50 through 52 in the control member 11 and three input jacks in the module 31.

Each of the logic modules may be mounted on the apertured member 10 to face in any desired horizontal or vertical direction. In this way an array of mounted modules can be arranged to correspond with the actual schematic diagram of a logic circuit to be simulated. Thus, for example, as shown in FIG. 1, each of the modules 31 through 33 is mounted to face to the right, whereas the module 34 is mounted to face upwards. Each of these modules can easily be moved to face in any one of the above-specified directions so as to conform in position and orientation to the corresponding circuit in a schematic diagram.

The nature of the signals that appear at the logic signal jacks 50 through 61 included in the control member 11 shown in FIG. 1 is determined by the manual setting of two-position switches 63 through 68. Two jacks are associated with each different switch, the respective stable positions of each switch being designated "1" and "0." When, for example, the switch 63 is manually set to its "1" position, an associated light 63a is thereby illuminated to signify the "1" state and, in addition, relatively high and low potentials respectively appear at the logic signal jacks 50 and 56 associated with the switch 63. Thus, if the switches 63 through 65 of FIG. 1 are each set to their "1" positions, and if the module 31 is assumed to be an AND circuit, the light 31f on the module 31 would be illuminated and a "1" signal would be applied from the output jack of the module 31 to the module 33 via the jumper 37.

A train of clock or enable signals is available at CLOCK jack 70 included in the control member 11 of FIG. 1. Illustratively, these signals comprise a repetitive pulse sequence whose maximum and minimum potential levels correspond respectively to the values of the "1" and "0" signals available at the logic signal jacks 50 through 61. Various clock pulses repetition rates may be provided. Thus, for example, if manually-settable clock signal selection switch 72 is set to its EXTERNAL position, the signals that appear at the jack 70 have the same frequency as the clock signals applied from an external source (not shown) to an EXTERNAL jack 73. Advantageously these signals are amplitude limited to protect internal circuits of the board and cubes. In this way a number of logic boards of the type shown in FIG. 1 may be interconnected and synchronized together to form larger logic arrays and systems than can be constructed with a single such board.

In response to setting the selector switch 72 to the position marked 1 Hz., there appears at the CLOCK terminal 70 a train of enabling signals characterized by a repetition rate of 1 pulse per second. Illustratively, such pulses are obtained by driving conventional pulse dividing circuitry by a 60-cycle alternating-current 115-volt line voltage. Advantageously such circuitry is housed under the control member 11. Similarly, pulses characterized by repetition rates of 5 and 60 per second may be obtained from the CLOCK terminal 70 by setting the switch 72 to the correspondingly-marked positions thereof. Of course other repetition rates may be substituted for those shown, or additional rates and positions of the switch 72 may be provided.

The remaining position of the clock signal selector switch 72 shown in FIG. 1 is marked MANUAL. In response to setting the switch 72 to this position, the CLOCK jack 70 provides thereat a steady-state "0" signal. This signal may be converted to a "1" signal by manual activation (to the right) of a switch 74, which is spring biased to the return to its normal or "0" position. Thus the duration and repetition rate of the enabling "1" signals provided at the CLOCK jack 70, when the switch 72 is in the MANUAL position, are determined entirely by manual manipulation of the switch 74.

The control member 11 also includes thereon a main ON-OFF alternating-current power switch 76 and an associated light 78 for indicating the condition of the switch 76.

When relatively long jumper leads are used, for example, to interconnect modules mounted on two different logic boards, there is a tendency for noise and crosstalk pick-up to cause spurious signals to appear on these leads. However, in accordance with the principles of the present invention, such pick-up is minimized. This meritorious characteristic stems from the fact that the ground plane formed by the conductive member 17 (FIG. 2) causes the electric field in the immediate vicinity of the surface of the member 10 to be nearly vertical. And since the above-mentioned leads are horizontal for the major part of their lengths, and since pick-up is caused by the component of the electric field parallel to the leads, the fact that the ground plane field is nearly vertical causes the noise pick-up to be very small. In this way the reliable interconnection of logic boards is made possible.

Manual actuation of standard mechanical switch elements (such as might, for example, be employed to implement the switches 63 through 68 and 74 shown in FIG. 1) inevitably gives rise to so-called contact bounce. This phenomenon arises when a switch member is thrown from engagement with a first to engagement with a second contact. Typically the member bounces off the second contact, re-engages the second contact, bounces off it again, and so forth. Eventually this vibratory action ceases and the member comes to rest in electrical engagement with the second contact.

To eliminate the contact bounce phenomenon and the vibratory wavetrain that results therefrom, each of the switches 63 through 68 and 74 of FIG. 1 advantageously constitutes a novel bounce-free configuration, as illustrated in FIG. 3. As shown therein, a two-position switch mechanism 75 is employed to connect a bias source 76 to either contact 75a or contact 75b. When the member 75 is moved downward from engagement with the contact 75a to engage the contact 75b, limited contact bounce about the contact 75b (indicated by the dashed lines) results. The consequence of such mechanical vibratory action is a waveform of the type identified by reference numeral 77. Eventually the member 75 comes to rest on the lower contact 75b and a steady-state positive potential is applied thereto. (Waveform 78 represents what occurs when the member 75 is subsequently moved upward to re-engage the contact 75a.)

The problem of contact bounce is solved in a unique way by respectively connecting the contacts 75a and 75b shown in FIG. 3 to the reset (R) and set (S) terminals of a conventional R-S flip-flop 79. Thus, when the switch member 75 is moved downward to engage the contact 75b, the first engagement therewith is effective to apply a positive pulse to the S terminal to set the previously-reset flip-flop 79. In response to this first positive pulse, the potential of output line 80 undergoes a transition from a relatively low to a relatively high value (represented by waveform 81). (At the same time the potential of output line 82 changes from a high to a low value—see waveform 83.) Any subsequent positive pulses (caused by contact bounce) are ineffective to change the condition of the output line 80 because the flip-flop remains set regardless of how many additional positive pulses are applied to the set terminal thereof.

Thus there has been described herein a specific illustrative embodiment of an improved educational and training aid that is adapted to provide effective visual demonstrations of the theory and actual operation of logic circuits.

It is to be understood that the herein-described embodiment is only illustrative of the principles of the present invention. In accordance with these principles numerous other arrangements may be devised by those skilled in the art without departing from the spirit and scope of the invention.

What is claimed is:

1. A logic board comprising a multi-apertured member and an associated control member, said members being mechanically connected together, the apertures in said first-mentioned member being equally spaced apart along a plurality of imaginary horizontal and vertical reference lines, said control member including therein a plurality of manually-settable bistable switches each having associated therewith a mounted light and at least one logic signal jack for providing an output signal whose nature is determined by the setting of the associated bistable switch, said light being adapted to indicate whether its associated switch is in a "1" or "0" condition, said control member further including mounted thereon a manually-settable clock signal switch including EXTERNAL and MANUAL positions and a plurality of additional positions each designative of a different number of clock pulses per second, said control member still further including mounted therein an EXTERNAL jack and a CLOCK jack and a unistable manual switch, so that when said clock switch is set to its EXTERNAL position, any external clock signals applied to said EXTERNAL jack appear at said CLOCK jack, and when said clock switch is set to one of said additional positions, a clock signal sequence of a specified repetition rate appears at said CLOCK jack, and when said clock switch is set to its MANUAL position, the clock signals appearing at said CLOCK jack are determined by manual actuation of said MANUAL switch, said board further including a plurality of logic modules each including at least one multi-conductor plug, said modules being adapted to be mounted on said multi-apertured member in any desired horizontal or vertical orientation so that said plugs extend through apertures therein, each of said modules comprising a housing for containing therein a logic circuit, a plurality of input jacks mounted in said housing for effecting connections to input terminals of said contained circuit, an output jack mounted in said housing for effecting connection to an output terminal of said contained circuit, a logic symbol marked on a visible surface of said housing for indicating the nature of the logic circuit contained therein, a status light mounted in said housing for indicating the ON or OFF condition of the contained circuit, and jumper leads for connecting said logic signal and CLOCK jacks in said control member to the input jacks of said modules and for connecting the output jacks of the modules to the input jacks thereof, said multi-apertured member comprising an apertured insulating sheet, said combination further including an insulating plate member spaced apart from said sheet and having a corresponding set of apertures aligned therewith, a conductive sheet disposed on the top side of said plate member, said conductive sheet constituting a reference plane to cause the electric field in the immediate vicinity of the surface of said multi-apertured member to be nearly vertical, a conductive sleeve mounted in registry with each pair of corresponding apertures through said insulating sheet and plate member and passing through said conductive sheet, means electrically contacting said sleeve and said conductive sheet, a power source having first and second terminals, conductive means disposed on the bottom side of said plate member in registry with each corresponding pair of apertures through said insulating sheet and plate member for receiving a portion of a module plug extended into an aperture, and means for respectively connecting said conductive means and said conductive sheet to said first and second terminals.

References Cited
UNITED STATES PATENTS

| | | | |
|---|---|---|---|
| 2,788,470 | 4/1957 | Giel et al. | 35—19X |
| 3,078,596 | 2/1963 | Sweeton | 35—19 |
| 3,309,793 | 3/1967 | Bartee | 35—10 |
| 3,363,333 | 1/1968 | Alexander | 35—19 |
| 3,410,001 | 11/1968 | Blum | 35—19 |

HARLAND S. SKOGQUIST, Primary Examiner